United States Patent [19]

Matrozza et al.

[11] Patent Number: 4,880,743
[45] Date of Patent: Nov. 14, 1989

[54] BACTERIAL COMPOSITION FOR INHIBITING PSYCHROTROPHIC BACTERIA IN CREAM OR MILK BASED PRODUCTS

[75] Inventors: Mark A. Matrozza, Sarasota; Marianne F. Leverone, Bradenton; Donald P. Boudreaux, Sarasota, all of Fla.

[73] Assignee: Microlife Technics, Inc., Sarasota, Fla.

[21] Appl. No.: 224,718

[22] Filed: Jul. 27, 1988

Related U.S. Application Data

[62] Division of Ser. No. 103,883, Oct. 2, 1987, Pat. No. 4,790,994.

[51] Int. Cl.[4] .......................... C12N 1/22; C12N 1/20
[52] U.S. Cl. .............................. 435/252.4; 435/252.9; 426/61
[58] Field of Search ....................... 426/34, 38, 40, 43, 426/42, 61; 435/252.4, 252.9, 260, 853–857, 822

[56] References Cited

U.S. PATENT DOCUMENTS

| 3,968,256 | 7/1976 | Sing | 426/38 |
| 3,975,545 | 8/1976 | Vedamuthu | 426/40 |
| 4,191,782 | 3/1980 | Vedamuthu | 426/38 |
| 4,477,471 | 11/1984 | Gonzalez | 426/43 |
| 4,720,960 | 1/1988 | Barach et al. | 435/260 |

OTHER PUBLICATIONS

Graham et al., Appl. and Envir. Microbiol. 50, 532–534 (1985).
Gilliland and Ewell, J. Dairy Science 66: 974–980 (1983).
Gilliland et al., American Public Health Assoc., Marvin L. Speck, ed., 172–178 (1976).

Primary Examiner—Marianne Cintins
Attorney, Agent, or Firm—Ian C. McLeod

[57] ABSTRACT

A bacterial composition including in admixture a lactic acid producing bacterium which produces diacetyl, particularly Streptococcus lactis subspecies diacetylactis and a Pediococcus which generates an antimicrobial metabolite at refrigeration temperatures which is used to inhibit psychrotrophic bacteria in a milk or cream based product without fermentation or significant increase in cell count is described. The composition preferably uses a Pediococcus pentosaceus which generates hydrogen peroxide as the metabolite.

9 Claims, No Drawings

BACTERIAL COMPOSITION FOR INHIBITING PSYCHROTROPHIC BACTERIA IN CREAM OR MILK BASED PRODUCTS

This is a divisional of co-pending application Ser. No. 103,883 filed on Oct. 2, 1987, now U.S. Pat. No. 4,790,994.

BACKGROUND OF THE INVENTION (1) Summary of the Invention

The present invention relates to a method for inhibiting psychrotrophic bacteria in finished cream or milk based products using a Pediococcus, preferably *Pediococcus pentosaceus*. In particular, the present invention relates to a method wherein the Pediococcus generates antimicrobic metabolites, particularly hydrogen peroxide, in Cottage cheese and other cream or milk based products at refrigeration temperatures used for storage.

(2) Prior Art

The use of *Streptococcus lactis* subspecies diacetylactis in Cottage cheese to inhibit psychrotrophic bacteria is described in U.S. Pat. No. 3,968,256 to Sing; U.S. Pat. Nos. 3,975,545 and 4,191,782 to Vedamuthu, and U.S. Pat. No. 4,477,471 to Gonzalez. This bacterial species produces an inhibitory substance in the Cottage cheese and other finished cream or milk based products which inhibits psychrotrophic bacteria. This species works well; however, there is a need for longer term inhibition of the psychrotrophic bacteria than is produced by the inhibitory substance produced by *Streptococcus lactis* subspecies diacetylactis.

Pediococci are used in meat and vegetable fermentations, and the like. Pediococci have not been used to any significant extent in the fermentation of milk based products since they are not as effective in this application because they do not grow well in milk. It is known that some Pediococci generate inhibitory substances called "bacteriocins" which inhibit other bacteria as discussed in Graham et al Appl. and Envir. Microbiol. 50, 532–534 (1985) which might be useful in fermented foods; however, where the food is not fermented by the Pediococci the bacteriocin would not be expected to be produced in significant amounts. There has been no suggestion by the prior art of the use of Pediococci in finished Cottage cheese or other cream or milk based products without fermentation for any purpose.

OBJECTS

It is therefore an object of the present invention to provide a method wherein a Pediococcus, particularly *Pediococcus pentosaceus*, is provided in finished Cottage cheese or other finished cream or milk based products without fermentation to produce improved inhibition of psychrotrophic bacteria. Further it is an object of the present invention to provide a method which is simple and economical to perform. These and other objects will become increasingly apparent by reference to the following description.

GENERAL DESCRIPTION

The present invention relates to a method for inhibiting the growth of psychrotrophic bacteria in a milk or cream based product which comprises: inoculating the milk or cream based product with a count of cells of a Pediococcus which produces antimicrobial metabolites sufficient to inhibit the growth of the psychrotrophic bacteria without fermentation; and storing the milk or cream based product during which time the antimicrobial metabolites are produced and the psychrotrophic bacteria are inhibited without a significant increase in the cell count of the Pediococcus. The antimicrobial metabolite is primarily hydrogen peroxide.

In particular, the present invention further relates to a method for inhibiting the growth of psychrotrophic bacteria in Cottage cheese which comprises: inoculating the Cottage cheese with a count of cells of a Pediococcus which produces antimicrobial metabolites sufficient to inhibit the growth of the psychrotrophic bacteria without fermentation; and storing the Cottage cheese during which time the antimicrobial metabolites are produced and the psychrotrophic bacteria are inhibited without an increase in the cell count of Pediococcus. In particular the Pediococcus is provided in cream dressing for the Cottage cheese.

Finally, the present invention relates to a bacterial composition which comprises cells of: a lactic acid producing bacterium which generates a diacetyl flavor at refrigeration temperatures in a milk or cream based product without fermentation and a Pediococcus which generates antimicrobial metabolites in the milk or cream based product at refrigeration temperatures, wherein the ratio of diacetyl producing bacteria to Pediococcus is between about 1 and 10 and 10 and 1 by cell count.

Preferably the Pediococcus is *Pediococcus pentosaceus*. The preferred *Pediococcus pentosaceus* strain which produces antimicrobial metabolites is *Pediococcus pentosaceus* NRRL-B-18229 which has been deposited with the National Regional Research Laboratory in Peoria, Ill. This strain is available upon request by name and number. Other strains of Pediococcus which produce hydrogen peroxide in the product can be used. Hydrogen peroxide production can be detected by the method described in Gilliland and Ewell, J. Dairy Science 66: 974–980 (1983).

To assay for hydrogen peroxide production, the culture was diluted to a cell concentration of $1 \times 10^{10}$ CFU/ml in water. One microliter of this diluted culture ($1 \times 10^7$ CFU) was spotted on hydrogen peroxide indicator plates. The plates consisted of 8.5% non-fat dry milk and 1.5% agar. The medium was sterilized and cooled to 45° C. To the tempered medium, 0.67 ml of a filter sterilized peroxidase solution (Sigma Chemical Co. 40 U/ml) and 1.0 ml of a filter sterilized 0.274% solution of 2-2'-azinobis(3-ethylbenzothiozoline-6-sulfonic acid), diammonium salt (ABTS; Aldrich Chemical Co.) was added. Spotted plates were incubated at 23° C. and 8° C. for 18 hours. The presence of hydrogen peroxide was indicated by a blue zone the diameter of which was proportional to the amount of hydrogen peroxide produced.

The Pediococcus can be provided as a bacterial concentrate which is frozen or lyophilized. Concentrates usually contain between about $10^9$ and $10^{12}$ CFU per ml or gram. The cultures can be used directly from a growth medium and usually contain between $10^8$ to $10^{10}$ cells per ml.

The Pediococcus can be used at a rate of between about $10^4$ to $10^9$ CFU per gram of Cottage cheese or other cream or milk based product. In creams, such as cream dressing for Cottage cheese or the like, the amount is preferably between about $10^5$ to $10^8$ CFU per ml.

Milk or cream based products into which the Pediococcus is inoculated are cream fillings for desserts, salad dressings, cream dressings for Cottage cheese and other food products, sour cream and the like. The spoilage problems with these products are well known to those skilled in the art.

The milk or cream based product is stored at reduced temperatures from room temperatures. Generally this temperature is at refrigeration temperatures which are less than about 10° C. The milk or cream based product is not fermented during storage. The cells do not divide (grow) significantly and thus do not ferment the milk or cream based product after introduction. Thus the cell count of the Pediococcus does not increase significantly (i.e. by more than about ten times).

The milk or cream based product, particularly the cream dressing, can also contain *Streptococcus lactis* subspecies diacetylactis to develop a diacetyl flavor and an inhibitory substance as is known in the prior art. *Streptococcus lactis* subspecies diacetylactis ATCC 15346 is preferred. A Leuconostoc can also be used to develop a diacetyl flavor in the milk or cream based product. Preferably they are used at a cell count between about $10^5$ and $10^8$ cells per ml or gram of the product.

SPECIFIC DESCRIPTION

The following examples show the results with Cottage cheese dressings. Equivalent results are achieved with other milk or cream based products.

EXAMPLE 1

PROCEDURE

Cottage cheese dressing was prepared using 200 ml of ultra-pasteurized half and half. Sodium chloride was added at 1.5% by weight and the dressing acidified to pH 5.0 using 85% by weight lactic acid.

The Cottage cheese dressing was inoculated from a frozen stock of psychrotrophic milk spoilage organisms obtained from commercial pasteurized milk. The initial psychrotrophic bacteria cell count of the dressing was $1.12 \times 10^4$ CFU/ml as determined using Crystal Violet Tetrazolium Agar as described by Gilliland et al (Psychrotrophic Microorganisms in *Compendium of Methods for the Microbiological Examination of Foods*, American Public Health Association, Marvin L. Speck, ed. 172–178 (1976)). This represents heavy contamination of the dressing.

The cream dressing was divided into $2 \times 100$ ml portions in sterile bottles. One bottle served as the control, and the other bottle was inoculated from a previously grown, concentrated, and frozen stock of *Pediococcus pentosaceus* NRRL-B-18229 which was thawed and used to deliver $8.9 \times 10^6$ CFU/ml of cottage cheese dressing.

The bottles were held at 5° C. and monitored for psychrotrophic bacteria count approximately every 7 days using Crystal Violet Tetrazolium Agar. The results are shown in Table 1.

RESULTS

TABLE 1

| Days @ 5° C. | CVT CFU/ml Cottage Cheese Dressing | |
|---|---|---|
| | Control | NRRL-B-18229 |
| 0 | $1.1 \times 10^4$ | $1.1 \times 10^4$ |
| 7 | $1.5 \times 10^4$ | $5.8 \times 10^3$ |
| 14 | $2.3 \times 10^5$ | $1.8 \times 10^3$ |
| 25 | $3.8 \times 10^8$ | <1000 |

TABLE 1-continued

| Days @ 5° C. | CVT CFU/ml Cottage Cheese Dressing | |
|---|---|---|
| | Control | NRRL-B-18229 |
| 41 | $3.2 \times 10^8$ | <1000 |

As can be seen from Table 1 there is not only an inhibition but a significant reduction of psychrotrophic bacteria using the *Pediococcus pentosaceus. Streptococcus lactis* subspecies diacetylactis is generally effective only for about 28 days. Example 1 is thus much better than the prior art.

EXAMPLE 2

PROCEDURE

A Cottage cheese dressing agar medium was prepared using 500 ml of ultra-pasteurized half and half. Sodium chloride and bacteriological agar were added at 1.5% each, and the medium was heated to boiling to dissolve the agar. After tempering to 45° C., the medium was acidified to pH 5.0 by adding 1.8 ml 85% lactic acid. The agar medium provides a convenient method of testing the inhibition of psychrotrophic bacteria in cream dressings.

The Cottage cheese dressing agar was then divided into $3 \times 100$ ml portions in sterile flasks and inoculated with the following cultures:

(A) Control—no culture
(B) *Pediococcus pentosaceus* (NRRL-18229) @ $8.9 \times 10^6$ cells/ml.
(C) *Streptococcus lactis* subspecies diacetylactis (ATCC 15346) at $5 \times 10^6$ cells/ml. (As previously indicated, this culture and inoculation is preferred by the prior art for Cottage cheese cream dressing).

The flasks were mixed well and two (2) petri plates poured per flask and allowed to solidify. All plates were surface inoculated with 0.1 ml of a dilution prepared from a frozen stock of psychrotrophic milk spoilage microorganisms obtained from commercial pasteurized milk. The psychrotrophic microorganisms were diluted to deliver approximately 1500 cells per plate. This represents a very high level of contamination in Cottage cheese.

One set of plates was incubated at 24° C. as shown in Table 2 and the duplicate set was incubated at 5° C. as shown in Table 3. The temperature of 24° C. is just below room temperature, which can happen if there is temperature abuse, and 5° C. is a refrigeration temperature. The plates were monitored daily for surface growth of the psychrotrophic microorganisms.

RESULTS

TABLE 2

| | Degree of Psychrotroph Growth[1] | | |
|---|---|---|---|
| Days at 24° C. | Control A | *P. pentosaceus*[2] B | *S. lactis*[3] C |
| 2 | 2+ | 0+ | 0+ |
| 4 | 4+ | 0+ | 1+ |
| 8 | 4+ | 0+ | 1+ |
| 10 | 4+ | 0+ | 1+ |
| 16 | 4+ | 0+ | 1+ |
| 36 | 4+ | 0+ | 1+ |

[1]Psychrotroph growth visually scored from 0+ (no growth) to 4+ (confluent lawn).
[2]*P. pentosaceus* (NRRL-B-18229) at $8.9 \times 10^6$ CFU/ml.
[3]*S. lactis* subspecies diacetylactis (ATCC 15346) at $5 \times 10^6$ CFU/ml.

TABLE 3

| Days @ 5° C. | Degree of psychrotroph Growth[1] | | |
|---|---|---|---|
| | Uninoc. Control A | P. pentosaceus[2] B | S. lactis[3] C |
| 4 | 0+ | 0+ | 0+ |
| 8 | 3+ | 0+ | 2+ |
| 10 | 3+ | 0+ | 3+ |
| 16 | 3+ | 0+ | 4+ |
| 36 | 3+ | 0+ | 4+ |

[1] Psychrotroph growth visually scored from + (no growth) to 4+ (confluent lawn).
[2] P. pentosaceus (NRRL-B-18229) at 8.9 × 10$^6$ CFU/ml.
[3] S. lactis subspecies diacetylactis (ATCC 15346) at 5 × 10$^6$ CFU/ml.

Tables 2 and 3 show that *Pediococcus pentosaceus* NRRL-B-18229 is much more effective than *Streptococcus lactis* subspecies diacetylactis ATCC 15346 against psychrotrophic microorganisms at 5° C. and 24° C.

Equivalent results are achieved with other milk or cream based unfermented products. It is very unexpected that Pediococci can achieve these results.

It is intended that the foregoing description be only illustrative and that the present invention be limited only by the hereinafter appended claims.

We claim:

1. A bacterial composition which comprises cells of:
   (a) a lactic acid producing bacterium which generates a diacetyl flavor at refrigeration temperatures in a milk or cream based product without fermentation; and
   (b) a Pediococcus which generates antimicrobial metabolites in the milk or cream based product at the refrigeration temperatures without fermentation, wherein the ratio of lactic acid producing bacteria to Pediococcus is between about 1 and 10 and 10 to 1 by cell count and wherein the product can be inoculated with an effective amount of the composition to inhibit the growth of psychrotrophic bacteria without a significant increase in the cell count at the refrigeration temperatures.

2. The composition of claim 1 wherein the lactic acid producing bacterium is a Leuconostoc.

3. The composition of claim 2 wherein the Leuconostoc is *Leuconostoc cremoris*.

4. The composition of claim 1 wherein the lactic acid producing bacterium is *Streptococcus lactis* subspecies diacetylactis.

5. The composition of claim 1 wherein the milk or cream based product is Cottage cheese.

6. The composition of claim 1 wherein the milk or cream based product is a cream dressing for Cottage cheese.

7. The composition of claim 1 which contains between about 10$^9$ and 10$^{13}$ CFU per ml or gram of bacteria in the composition.

8. The composition of claim 1 wherein the Pediococcus is a *Pediococcus pentosaceus* which generates hydrogen peroxide in the product.

9. The composition of claim 1 wherein the Pediococcus is *Pediococcus pentosaceus* NRRL-B-18229.

* * * * *